(12) United States Patent
Vikberg et al.

(10) Patent No.: US 10,212,753 B2
(45) Date of Patent: Feb. 19, 2019

(54) HANDLING OF BACKUP PATHS IN RADIO ACCESS NETWORKS

(71) Applicant: TELEFONAKTIEBOLAGET LM ERICSSON (PUBL), Stockholm (SE)

(72) Inventors: Jari Vikberg, Järna (SE); Christofer Lindheimer, Linköping (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 15/523,159

(22) PCT Filed: Oct. 30, 2014

(86) PCT No.: PCT/EP2014/073392
§ 371 (c)(1),
(2) Date: Apr. 28, 2017

(87) PCT Pub. No.: WO2016/066211
PCT Pub. Date: May 6, 2016

(65) Prior Publication Data
US 2017/0318507 A1 Nov. 2, 2017

(51) Int. Cl.
*H04L 12/26* (2006.01)
*H04W 76/16* (2018.01)
(Continued)

(52) U.S. Cl.
CPC ....... *H04W 76/16* (2018.02); *H04W 36/0072* (2013.01); *H04W 40/36* (2013.01);
(Continued)

(58) Field of Classification Search
None
See application file for complete search history.

(56) References Cited

U.S. PATENT DOCUMENTS

2008/0095163 A1* 4/2008 Chen .................. H04L 45/16
370/392
2009/0323519 A1* 12/2009 Pun .................... H04L 45/20
370/225
(Continued)

FOREIGN PATENT DOCUMENTS

WO 2014140408 A1 9/2014

OTHER PUBLICATIONS

Ford, et al. TCP Extensions for Multipath Operation with Multiple Addresses, draft-ietf-mptcp-rfc6824bis-03, Internet Engineering Task Force Internet—Draft RFC 6824, Oct. 27, 2014.

*Primary Examiner* — Phirin Sam
(74) *Attorney, Agent, or Firm* — Sage Patent Group

(57) ABSTRACT

The present disclosure relates to a method performed in a radio communications network which is configured to enable multipath communication. The method comprises providing an explicit indication that a path within a multipath connection is a backup path prior to establishment on or handover to a radio link of the backup path, transmission of the explicit indication to the base station, where it is interpreted. This allows an early indication that the path is a backup path and allows the base station to handle and prioritise use of radio network resources and/or connection characteristics for the radio link. The explicit indication may be in the radio level signalling or in handover signalling.

20 Claims, 16 Drawing Sheets

(51) Int. Cl.
  *H04W 76/22* (2018.01)
  *H04W 76/15* (2018.01)
  *H04W 36/00* (2009.01)
  *H04W 40/36* (2009.01)
  *H04W 72/10* (2009.01)
  *H04W 80/06* (2009.01)
  *H04W 84/12* (2009.01)
  *H04L 29/06* (2006.01)

(52) U.S. Cl.
  CPC ........... *H04W 72/10* (2013.01); *H04W 76/15* (2018.02); *H04W 76/22* (2018.02); *H04L 69/14* (2013.01); *H04L 69/163* (2013.01); *H04W 80/06* (2013.01); *H04W 84/12* (2013.01)

(56) References Cited

U.S. PATENT DOCUMENTS

| | | |
|---|---|---|
| 2010/0265818 A1 | 10/2010 | Chen et al. |
| 2013/0064198 A1 | 3/2013 | Krishnaswamy et al. |
| 2013/0095806 A1* | 4/2013 | Salkintzis ............. H04L 65/601 455/414.3 |
| 2013/0114481 A1* | 5/2013 | Kim ........................ G06F 15/16 370/310 |
| 2013/0128773 A1* | 5/2013 | Thubert .................. H04L 41/12 370/254 |
| 2014/0270749 A1* | 9/2014 | Miniscalco ........... H04B 10/118 398/5 |
| 2014/0362765 A1* | 12/2014 | Biswas .................... H04L 45/24 370/328 |
| 2016/0007295 A1* | 1/2016 | Kahn ................ H04W 52/0251 370/311 |
| 2016/0112239 A1* | 4/2016 | Kanugovi ............. H04W 88/16 370/338 |
| 2016/0302134 A1* | 10/2016 | Kim ........................ G06F 15/16 |
| 2016/0373533 A1* | 12/2016 | Biswas .................... H04L 45/24 |
| 2017/0006493 A1* | 1/2017 | Chincholi ............. H04W 24/10 |
| 2017/0104562 A1* | 4/2017 | Doken .................. H04L 5/0037 |
| 2017/0237652 A1* | 8/2017 | Calmon .................. H04L 45/24 370/315 |

* cited by examiner

HANDLING OF BACKUP PATHS IN RADIO ACCESS NETWORKS

This application is a 371 of International Application No. PCT/EP2014/073392, filed Oct. 30, 2014, the disclosure of which is fully incorporated herein by reference.

TECHNICAL FIELD

The field of the invention is the handling of backup paths in radio access networks.

BACKGROUND

Mobile operators of wireless telecommunications networks frequently use Wi-Fi networks to offload data traffic from the wireless telecommunications networks. The usage of Wi-Fi networks is motivated mainly because of its free and wide unlicensed spectrum, as well as, the increased availability of Wi-Fi capabilities in wireless devices, such as, e.g. smartphones and tablets. The end-users of the wireless devices are also becoming more and more comfortable with using Wi-Fi networks.

In many instances, more than one Radio Access Technology (RAT) may be used simultaneously by the same User Equipment (UE). This may be to improve performance, for example, by increased throughput, improved resiliency and/or improved coverage. Typically, Multi-Path TCP (MPTCP) can be used to transfer TCP segments belonging to a single end user application using multiple paths ("subflows") to and from the client. One very likely scenario is that one MPTCP subflow goes over Wi-Fi/WLAN and another MPTCP subflow goes over a 3GPP RAT.

Alternatively, a second RAT may be used as a backup connection for a main connection using a different access network. With MPTCP, it is also possible to define paths as backup paths, which are only to be used when there are no other available regular paths. It is envisaged that a common scenario in the future of MPTCP is that smart phone users are having a regular path or subflow towards a home Wi-Fi access point and a backup path or subflow using a 3GPP operator subscription, for example, over WCDMA or LTE radio access network.

However, there are drawbacks to establishing and maintaining such backup paths. These are typically used to transmit only control signalling to maintain the backup path/subflow, for example establishment, release and possible keep-alive signalling for the backup path/subflow, and are only occasionally associated with data traffic. It is necessary to create both radio access network and core network level of connectivity to enable such establishment and release of backup paths. One example is in relation to 3GPP Evolved Packet System consisting of both LTE (E-UTRAN) radio access network and EPC core network: A UE that wants to establish a backup path, e.g. using MPTCP, needs to enter a so called "connected" state to enable communication towards an MPTCP-server via the EPS. The UE is normally in the "connected" state for a short while and then moves to an "idle" state. Once the backup path is to be released, the UE needs to again enter the "connected" state to signal the release of the backup path. Therefore, a lot of signalling overhead may be introduced without any useful information being sent, resulting in additional load on different network nodes and increased interference on other signals. In some situations, for example, when there is high load on a network, it may be desirable to limit the backup paths that do not carry any traffic, for example by restricting their usage of network resources via connection admission control, by giving such paths a lower priority compared to other paths and UEs, or by restricting their power.

In order to implement such restrictions, it is necessary for the networks to recognise which paths are backup paths. It is also beneficial to recognise that a UE has only backup paths in a particular radio access network. Two mechanisms exist in the prior art for identifying backup paths. The first of these is the use of the "B" bit in the MPTCP header and signalling. The second is the use of deep packet inspection in the network to identify paths in which little or no data is being transmitted. Both of these mechanisms require both a radio level connection (and also a core network level connectivity) and a backup path to be already set up before identification of the backup path can take place, with a consequent lack of the option of introducing the described restrictions early on as part of the establishment of the radio level connection.

SUMMARY

Accordingly, in a first aspect of the present invention there is provided a method performed in telecommunications network comprising a user equipment and a network node. The method comprises the steps of prior to initiating establishment on, or handover to, a radio link involving a network node of a backup path for a multipath connection, providing an explicit indication of a multipath priority level of the backup path to the network node and transmitting the explicit indication to the network node. The method further comprises the step, at the network node, of interpreting the explicit indication to handle and prioritise use of radio network resources and/or manage connection characteristics of the radio link.

Optionally, the backup path is for a multi-path transmission control protocol (MPTCP) connection.

Optionally, the explicit indication is provided in one or more of the layer 3 protocol, a Medium Access Control (MAC) layer or a physical layer.

Optionally, the explicit indication is provided in the signalling of a Radio Resource Control (RRC) protocol.

Optionally, the step of managing connection characteristics comprises assigning a power level to the radio link.

Preferably, the method comprises the step of providing the indication by means of an application programing interface.

Optionally, the explicit indication is included in handover signalling.

Optionally, the step of providing an explicit indication comprises, at the user equipment, determining the priority level of the low priority path by inspecting traffic of the multipath connection.

In a second aspect of the present invention, there is provided an apparatus for use in user equipment in a communications network. The apparatus comprises processor circuitry, storage units, storage instructions executable by said processor circuitry. The apparatus is operative to, prior to initiation or establishment on, or a handover to a radio link involving the network node of a backup for multipath connection, provide an explicit indication of a multipath priority level for the backup path to the network node.

In a third aspect of the present invention, there is provided an apparatus for use in a network node. The apparatus comprises processing circuitry, a storage unit storing instructions executable by the processor circuitry. The apparatus is operative to, prior to initiation of establishment on, or a handover to a radio link involving the network node of a backup path for multipath connection, receive and interpret an explicit indication that of the priority level of the backup path and based on the interpretation, manage admission control and/or connection characteristics for said radio link.

BRIEF DESCRIPTION OF THE DRAWINGS

The above and other aspects of the present invention will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

The described embodiments relate to systems implemented using Multi-Path Transmission Control Protocol (MPTCP). However, the person skilled in the art will readily recognise that the present invention may also be applied to other protocols, for example, the Real Time Protocol (RTP), which may implement multipath connections. The present invention applies to any technology and protocols that contain the concept of both a main/regular connection or path, and a backup connection or path. A typical system and the methods for setup of a multipath connection according to the prior art will now be described so that it may be clear how the present invention fits into the prior art systems and mechanisms.

A typical system upon which the present invention may be implemented comprises User Equipment (UE) in communication with more than one network node, located typically in different networks. An example would be a UE which is able to communicate simultaneously with a base station in a cellular network and with an Access Point (AP) of a Wi-Fi network. In another example the UE would be able to communicate simultaneously with two different radio base stations belonging to same or different RATs.

Figure 1:
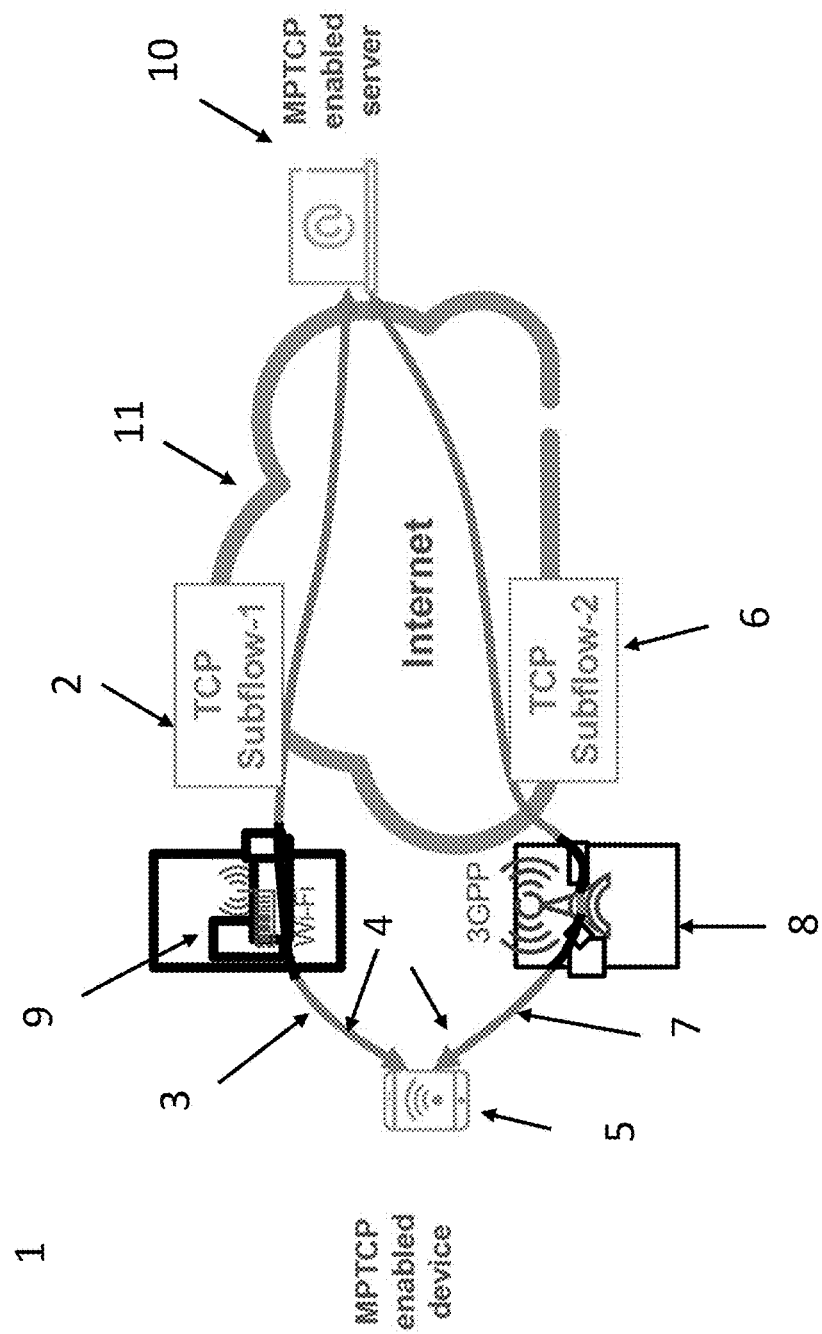
FIG. 1 is a network diagram showing TCP paths for an MPTCP system.

Such a system (1) is illustrated in FIG. 1, which shows a multi-path TCP arrangement (4) in which an MPTCP enabled device (5) is connected by two TCP paths (2, 6) to an MPTCP enabled server (10). The first TCP path (2) goes across a Wi-Fi network (3) to a Wi-Fi access point (9). The second TCP network goes via a Third Generation Partnership Project (3GPP) network (7) to a 3GPP base station (8). The two TCP paths can be respectively a main path and a backup path. In the arrangement illustrated in FIG. 1, the paths remain separate through core network (11), but alternatively they may recombine at an MPTCP proxy. In the example described, it will be assumed that the main path is through the Wi-Fi network and that the path over 3GPP network is the backup path.

Figure 2:
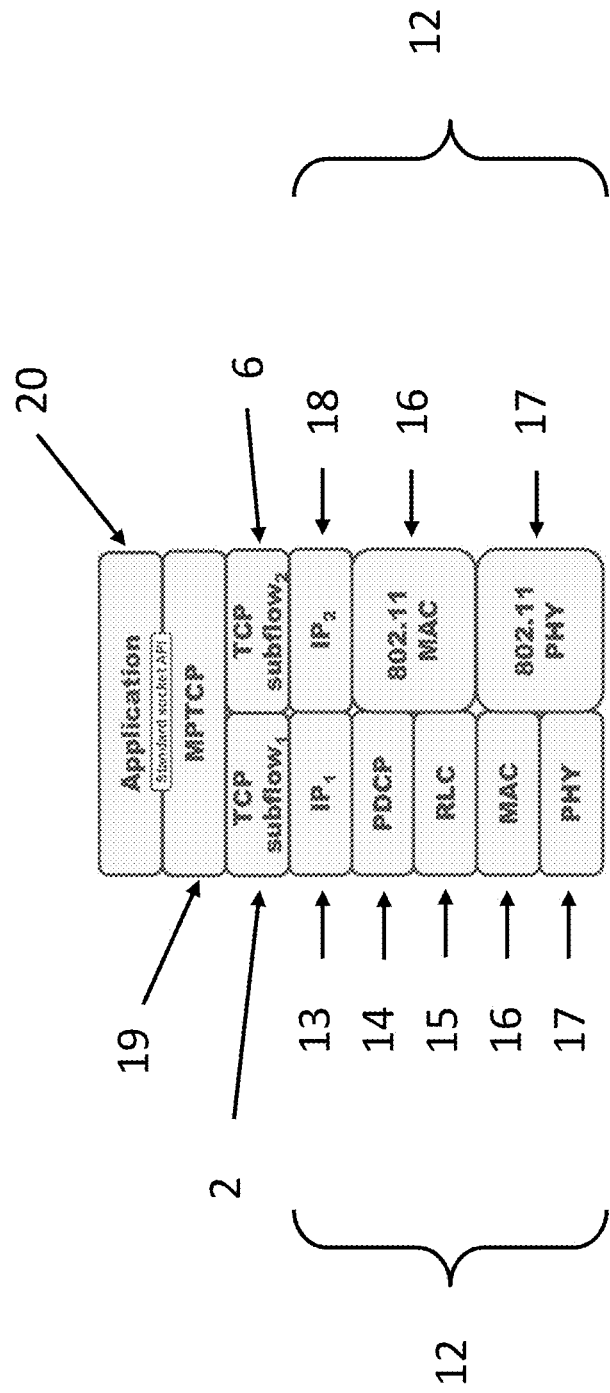
FIG. 2 is a Stack diagram showing protocol layers for two TCP paths, one for a 3GPP network and another for a Wi-Fi network.

FIG. 2 shows the protocol stack for such an arrangement. There is an application layer (20), an MPTCP layer (19), which uses two different paths on TCP layer; path-1 (2) and path-2 (6). The MPTCP paths are carried over different lower layers (12), depending on the technology on which they are transported. The paths go over respectively the Internet Protocol (IP) layers (13, 18). In the 3GPP network, the protocol stack further comprises a Packet Data Convergence Protocol (PDCP) (14), Radio Link Control (RLC) (15), Medium Access Control (MAC) (16) and the physical layer (17). The Wi-Fi side protocol stack comprises the IEEE 802.11 medium access control layer (MAC) (16) at layer 2 and the IEEE 802.11 physical layer in the physical layer (17).

Figure 3:
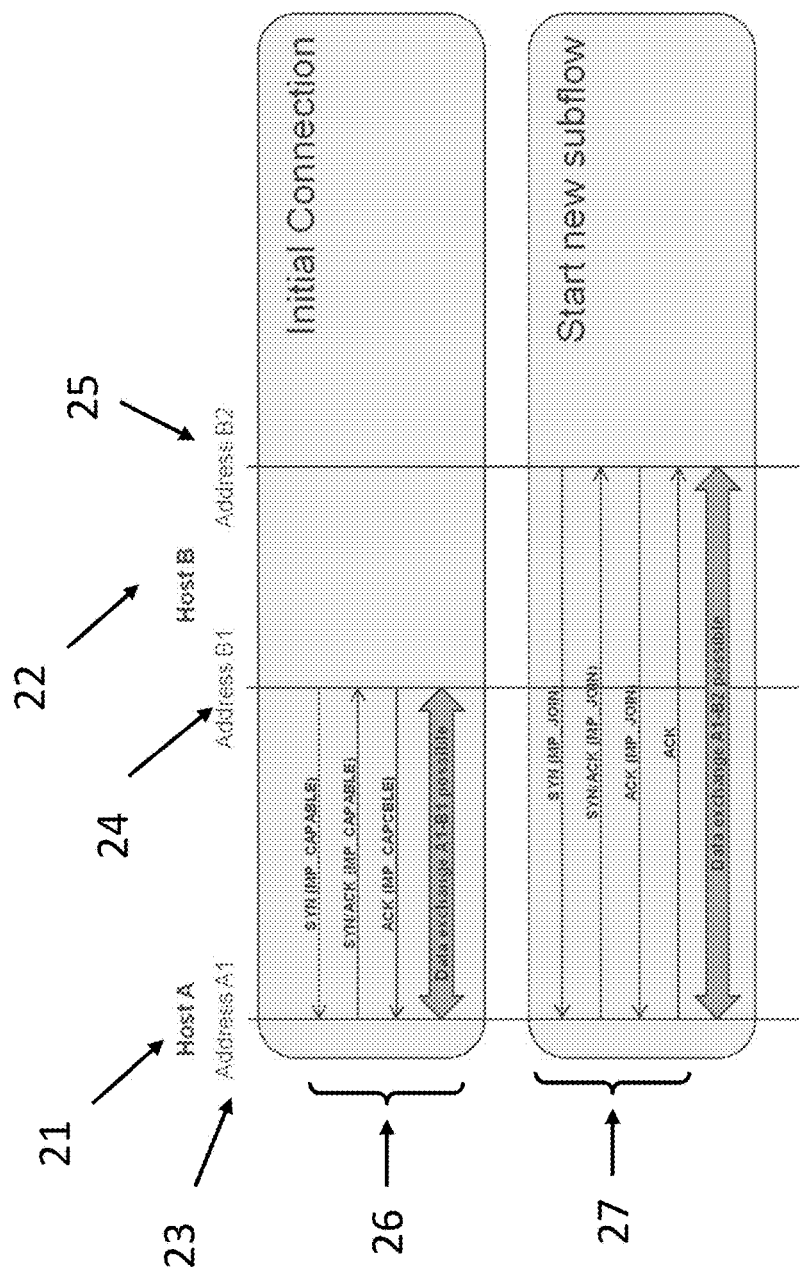
FIG. 3 is a connection diagram for the connection sequence for the setup of the new path for an MPTCP connection.

The person skilled in the art will appreciate that the independence of the layers of the protocol stack enables the setup of MPTCP links over any lower layer protocols. The initiation of a multipath connection setup for the paths is therefore the same in both networks, and in any other type of network over which MPTCP is implemented. This initiation process is illustrated in FIG. 3, which shows a connection set up between Host A (21) and Host B (22). The first stage of the establishment of the multi-path connection is the setup of the initial connection (26). This sets up a first connection, which, in the case of a system according to the invention comprising a main path and a backup path, is the main path. The setup of the initial or main connection comprises the usual three-way handshake sequence for TCP connection initiation. This involves a SYN, SYN/ACK and ACK exchange on the first path. Each of these messages carries an MP capable indication to communicate between end equipment that each side is capable of establishing a multi-path connection. Once this first connection is established, data exchange between the two end devices from Host A address A1 (23) to Host B address B1 (24) is possible.

The second stage (27) of the multi-path setup, which, if it is used according to the present invention involves the setup of a backup path, comprises a second three way handshake. The backup path is established between Host A (21) address A1 (23) and Host B (22) address B2 (25). Once again this consists of a SYN, SYN/ACK, ACK series. For this second connection, the MP_JOIN option is set in both the SYN packet and the SYN/ACK packet, to indicate that this is a second connection joining an initial connection.

It will be appreciated by the person skilled in the art that the establishment of multi-path connections for protocols other than MPTCP will require a similar initiation sequence.

In order to establish a multi-path backup path, a radio link (or radio connection in which the UE enters the "connected" state such as moving from RRC-IDLE state to RRC-CONNECTED state in LTE) needs to be established prior to this sequence to provide the possibility to communicate. By way of example, the sequence for the setup of a radio link between UE and an eNodeB for a Long Term Evolution (LTE) network is described. The skilled person will appreciate that similar sequences will be needed for set up of a link if different Radio Access Technologies (RAT) are used. The invention does not depend on any specific RAT or any specific radio link establishment procedure.

Figure 4:
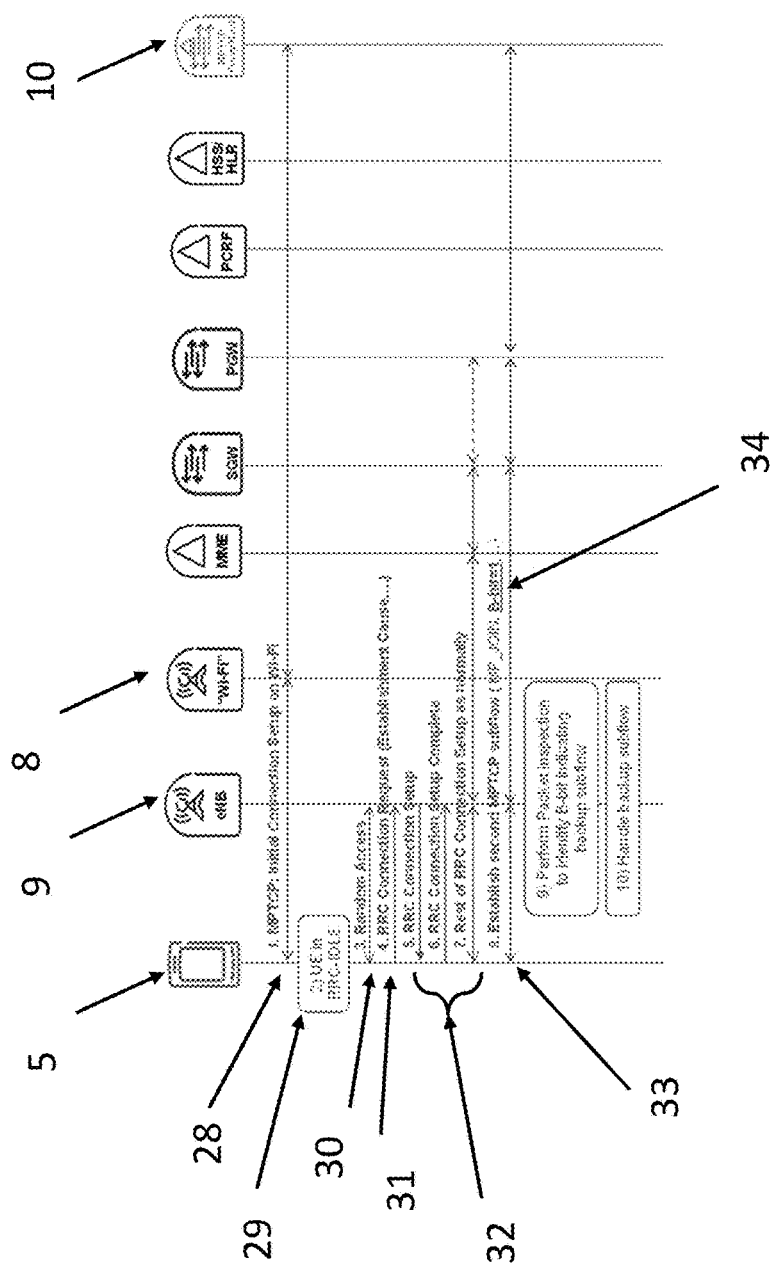
FIG. 4 is a connection diagram for the connection setup procedure according to the prior art in which the packet inspection is used to identify a backup path.

The process of establishing such a connection is shown in FIG. 4. Before the backup path is established, a main flow is established (28) between UE and MPTCP enabled Host/ proxy (10). At this point the UE is in RRC-IDLE mode (29). The process of establishing a backup path begins with a Random Access Request (30) to eNodeB (9) from UE (5). Once the random access procedure has been performed, it is followed by RRC connection establishment (31) and the rest of the steps (32) needed for the UE to enter "connected" state to enable communication through both the radio access network and the core network. Only when these steps have completely been finished can the MPTCP backup path be established at step (33).

Once the path has been established, it can be recognised as a backup path using one of the prior art mechanisms. This may be by deep packet inspection in the eNodeB to determine whether significant data traffic is flowing on the path or by shallow packet inspection of the TCP optional header fields used for MPTCP signalling to read the "B"-bit.

However, if either of these mechanisms is used then a lot of network resources is used in the radio link setup procedure before it is recognised that the radio link required is actually only used for a backup path. An aim of the present invention is to reduce this usage of network resources, especially in situations with high load by providing an earlier indication that the radio link is a used for backup path. This will allow an early rejection of the connection by Connection Admission Control (CAC) or the setting of very low power for the connection by the eNodeB.

The basic principle is that the user equipment indicates early at radio layer signalling that the activity is related to a backup path establishment or release. The early indication can be also seen as an indication that the UE only has backup paths over a specific radio link connection in a specific radio access network. The radio layer signalling may be performed using, for example, Layer 1 (Physical Layer), Medium Access Control (MAC) or Radio Resource Control connection (RRC) protocols and related signalling. These protocol layers are called as "lower layer protocols", or simply as "lower layers".

Figure 5:
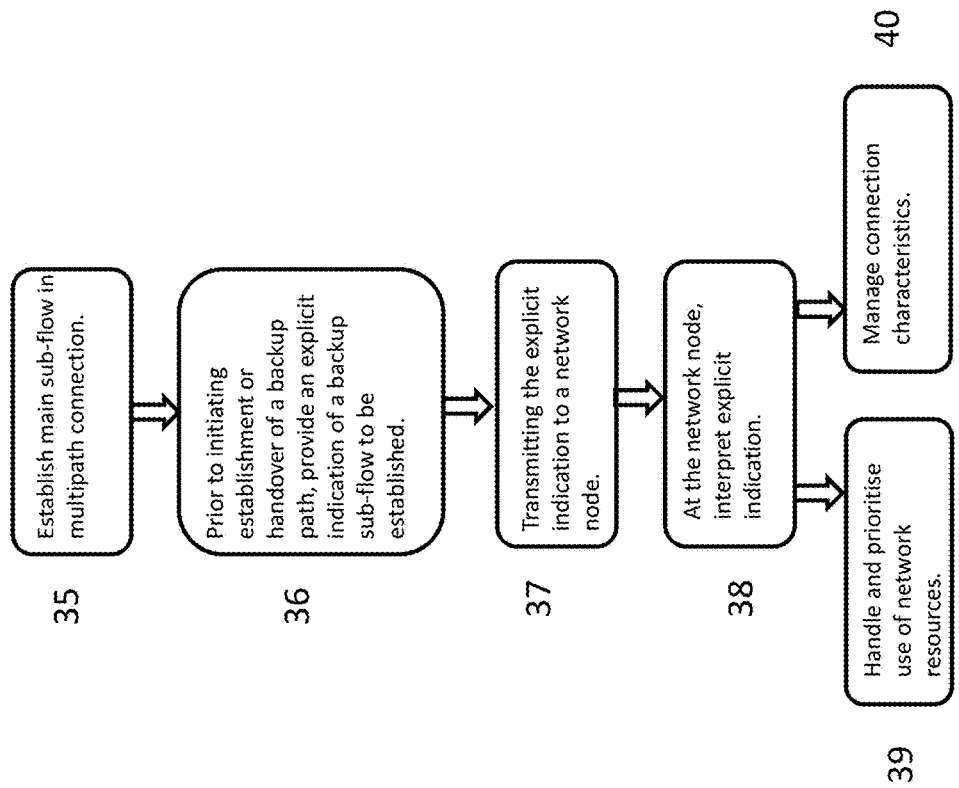
FIG. 5 is a flow diagram for providing and transmitting an explicit indication of a backup path.

The procedure for establishing a multi-path TCP connection with an explicit indication of a backup path according to an embodiment is shown in FIG. 5. At a first step (35) a main path is set up. Prior to initiating the establishment of a backup path for the connection or alternatively the handover of such a path, an explicit indication of a backup path to be established is provided (36). In one embodiment the explicit indication is used to indicate that a UE has only backup paths in a particular radio access network. The explicit indication is transmitted (37) to a network node, typically a base station, which interprets (38) the explicit indication and either handles and prioritizes use of radio network resources (39) and/or manages connection characteristics for the radio link (40). The handling and prioritizing use of radio network resources can include for example applying admission control or by giving UEs with only backup paths a lower priority compared to other paths and UEs. The managing of the connection characteristics for the radio link can include managing of power for the connection. It is a common situation that a RAT is congested in at least some of the cells or areas, especially hot spots. In these circumstances, the client will experience a risk of being rejected at CAC or, if admitted, the throughput will be very low due to sharing of the cell capacity with many other users. Additionally, each user that is in connected mode in a 3GPP RAT consumes resources (mainly radio resources such as download power and uplink noise raise) further reducing the resources available for transferring data. Although the examples here relate principally to LTE, the term base station is used to cover eNodeBs and similar nodes to emphasise its generic nature and the applicability of the disclosed techniques to other kinds of Radio Access Network.

Figure 6:
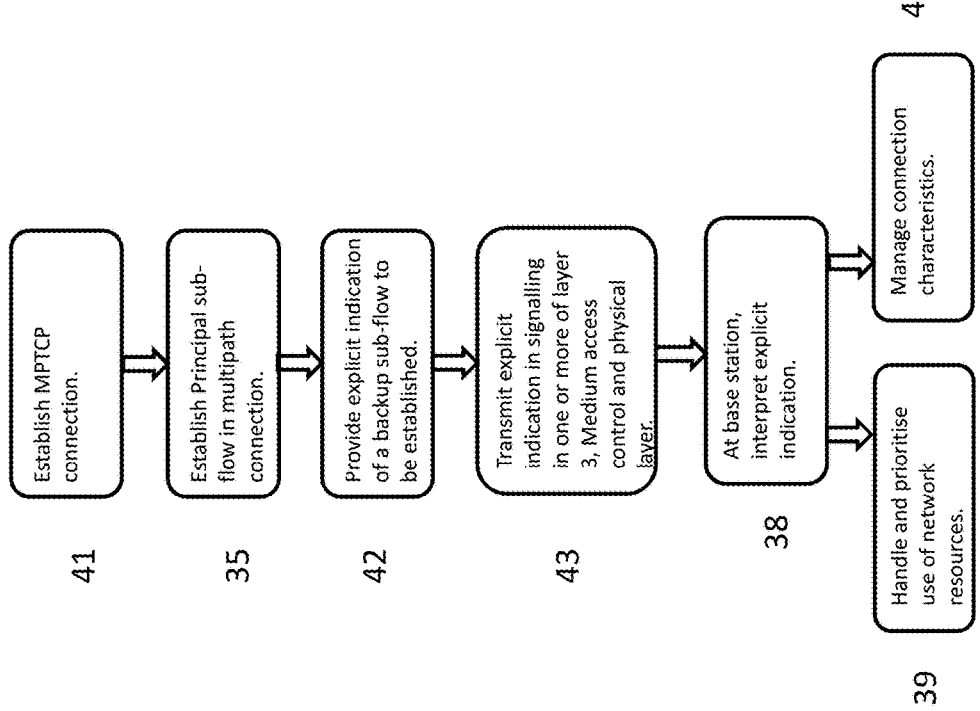
FIG. 6 is a flow diagram for providing and transmitting an explicit indication of a backup path in one of the three lower protocol layers.

FIG. 6 is a flow chart for an embodiment of the invention in which the explicit indication is transmitted in one of the lower protocol layers. As before, an MPTCP connection is set up (41), starting with the setup (35) of the main path. Before a backup path is established, a radio link establishment is initiated, with an explicit indication that a backup path is to be established (42). The explicit indication is transmitted in one of the three lower layers (43), i.e. one of layer 3 (RRC), the MAC layer or the physical layer. The explicit indication is interpreted (38) by the base station, which handles and prioritizes use of radio network resources (39) and/or manages connection characteristics for the radio link (40). The handling and prioritizing use of radio network resources can include for example applying admission control or by giving UEs with only backup paths a lower priority compared to other paths and UEs. The managing of the connection characteristics for the radio link can include managing of power for a connection which supports a backup path.

Figure 7:
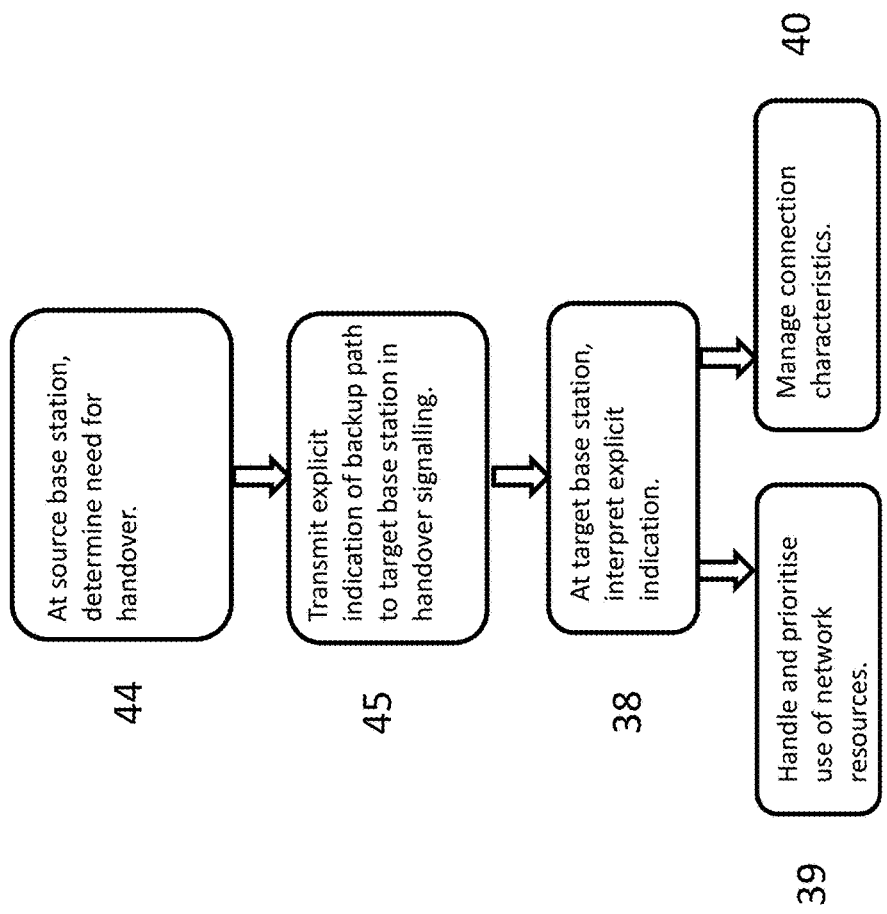
FIG. 7 is a flow diagram providing and transmitting an explicit indication of a backup path at handover.

The early identification of backup paths is important not just at the establishment of a new radio link, but also when a radio link is handed over to a different base station. In another embodiment of the invention the explicit indication of backup path is provided in the handover signalling between a source base station and a target base station. In this case the source base station has previously received the early indication of backup paths either from the UE or from another radio base station as part of handover signalling. FIG. 7 is a flow chart for an embodiment which provides the explicit indication in the handover signalling. In a first step (44), at the source base station, the need for a handover is determined. The explicit indication of a backup path is sent to the target base station in handover signalling (45). At the target base station the explicit indication is interpreted (38)

and either the admission control (39) or the management of connection characteristics (40) is carried out. In one embodiment the explicit indication is used to indicate that a UE has only backup paths in a particular radio access network.

In another embodiment, it is also possible to change the status of the early indication of backup paths for already established radio links. The UE may initially start with a radio link that is not established with an associated early indication of backup paths. The UE may later detect that there are only backup paths active and then provide the explicit indication of backup path and transmit it to the radio base station. The transmission to the radio base station of the explicit indication can be performed using any of the described "lower layer" protocols, one example is a new or existing RRC message when the UE is already in a "connected" state, and the RRC message contains the indication of backup paths. The actions taken by the radio base station are similar to those already described above.

Figure 8:
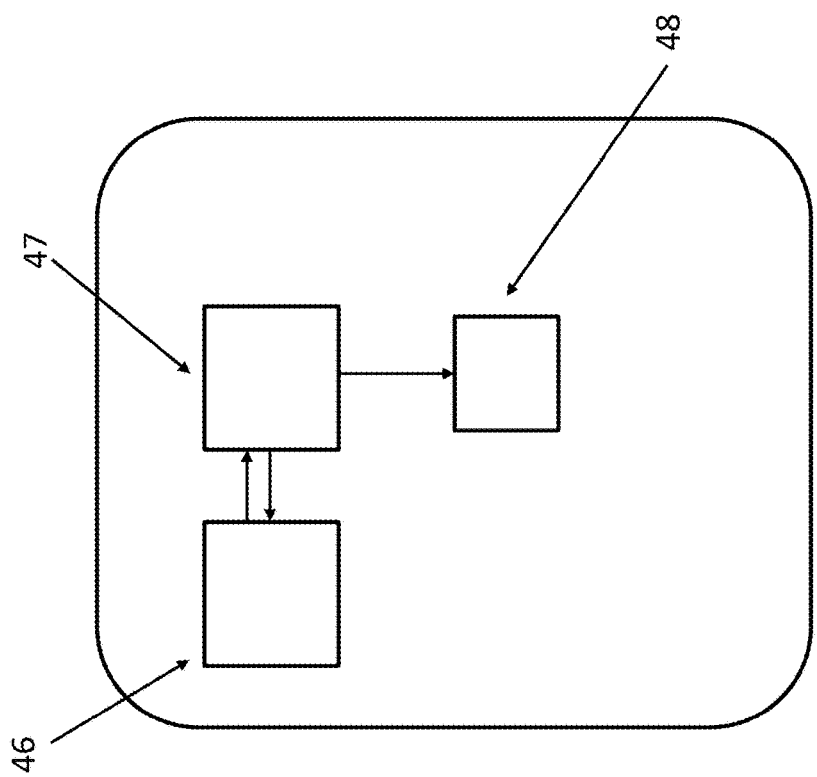
FIG. 8 is a functional diagram for apparatus at a user equipment.
Figure 9:
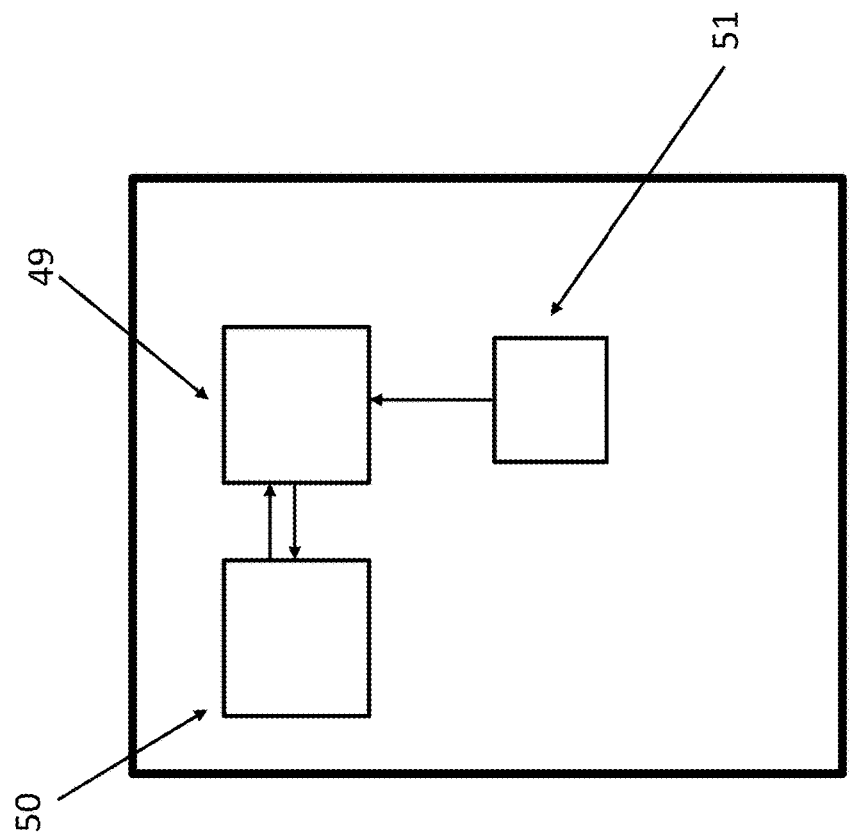
FIG. 9 is a functional diagram for apparatus at a network node.

In order to be able to implement the steps of the methods described in the above embodiments, both the user equipment and the base stations must be configured to provide an explicit indication and the base stations must be configured to receive and interpret the indications provided. FIG. 8 is typical layout of apparatus for use in user equipment (5). It comprises processor circuitry (47), a storage unit (46) for storing instructions executable by the processor circuitry and transmission equipment (48). The corresponding base station equipment (8) is illustrated schematically in FIG. 9. This comprises processor circuitry (49) and storage unit (50) for storing instructions executable by the processor circuitry. Finally there is the transmission and receiving equipment (51).

Figure 10:
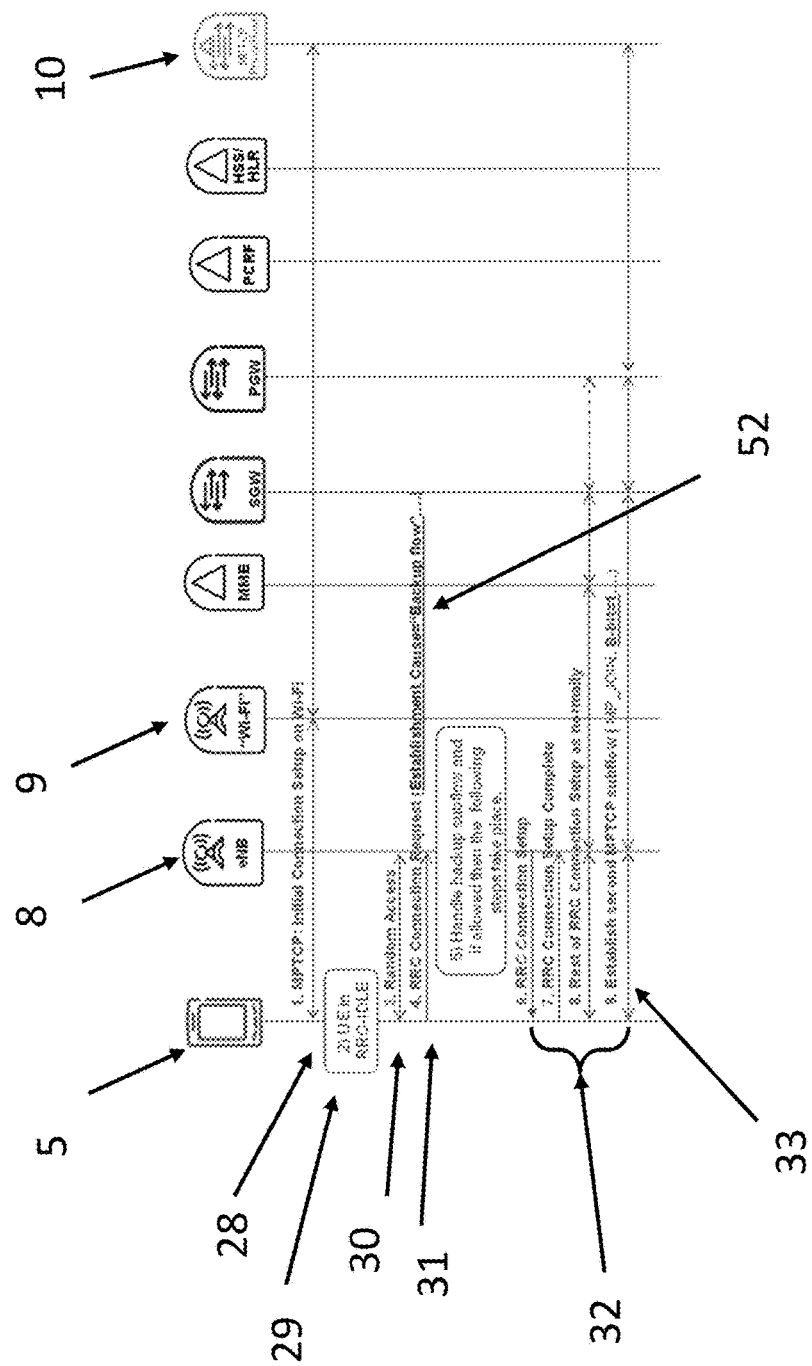
FIG. 10 is a connection diagram for providing and transmitting an explicit indication of a backup path in an Radio Resource Control (RRC) connection request.

There are a number of alternative implementations for the embodiments in which the explicit signalling is transmitted in one of the lower protocol layers. In one embodiment the backup path indication is at RRC protocol layer. This embodiment is illustrated in FIG. 10, which shows the normal sequence of establishing a radio link in addition to the provision of the explicit indication. The process of establishing the radio link begins with the random access procedure (30). The first RRC message is the RRC connection request (31), also known as the first message. In an embodiment, use is made of the "establishment cause" field (52) within the RRC connection request. This field is used to indicate the type of connection to be setup and typically contains indications such as "emergency", "high priority access" etc. In an embodiment, this field may be set to a new instruction "backup path" to provide the explicit indication of the backup path.

Figure 11:
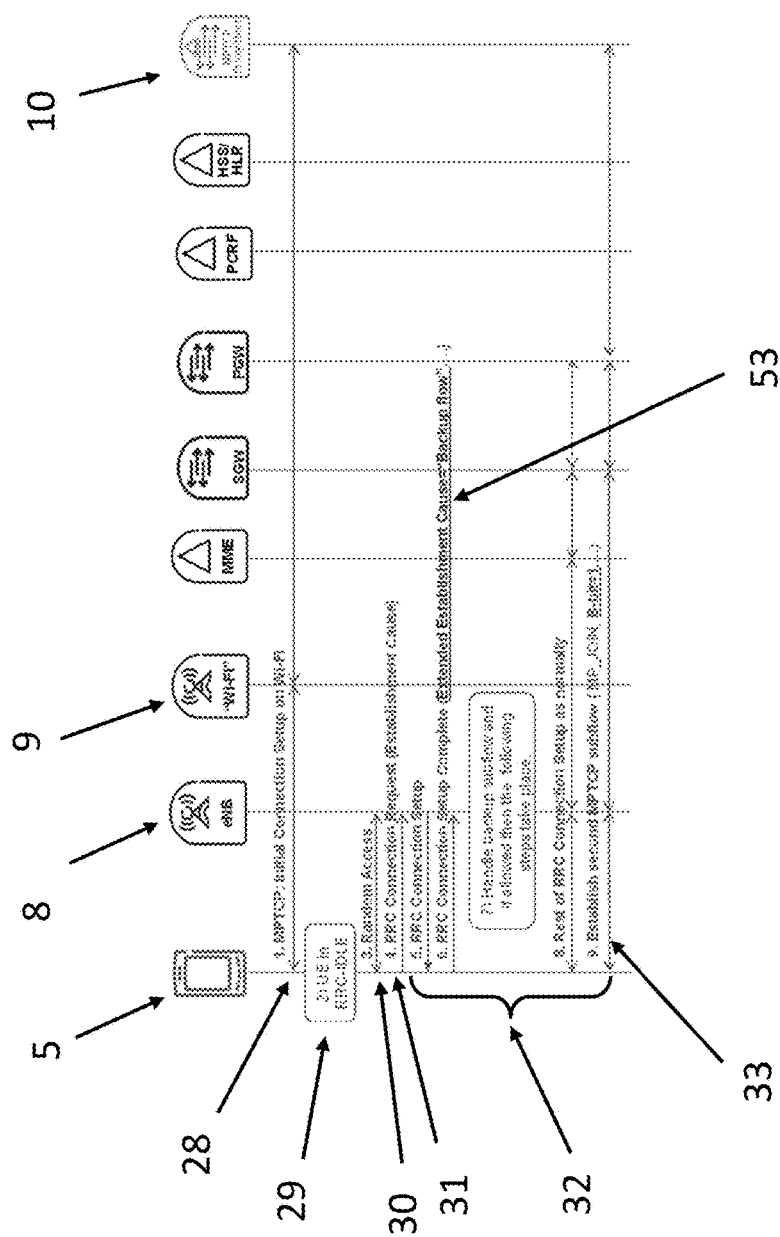
FIG. 11 is a connection diagram for providing and transmitting an explicit indication of a backup path in an RRC connection request complete indication.

In an alternative embodiment shown in FIG. 11 the explicit indication is transmitted in the RRC connection setup complete message, also known as the third message. Here the field used is an "extended establishment cause" (53) which is set to "backup path". This second approach may be beneficial in the case that the size of the first message is limited and it would not be feasible to extend it. Once the radio connection is set up (i.e. if allowed by the radio base station), the establishment of the MPTCP path may be made through the base station (8) to the gateways SGW (29) and PGW (30) to the MPTCP enabled server (10).

Figure 12:
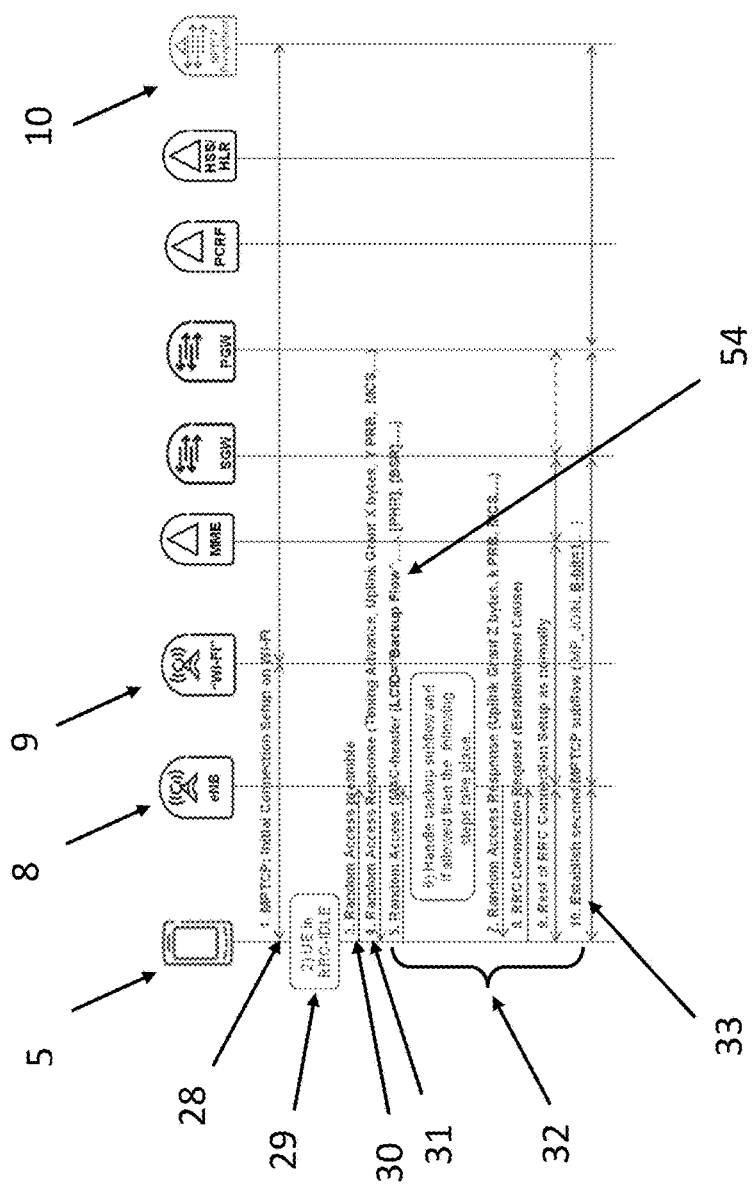
FIG. 12 is a connection diagram for providing and transmitting an explicit indication of a backup path in the Medium Access Control (MAC) layer.

In another embodiment the explicit indication is provided in the MAC layer. This is an improvement on RRC layer signalling because it is one stage earlier than the RRC message. In an embodiment the backup path indication is based on the logical channel Identifier (LCID) information element. A new LCID value is used to indicate "backup path" and this value can, for example, be from the range of reserved values for LCID. In this case the base station may receive the LCID even before the UE sent any RRC messages. This embodiment is illustrated in FIG. 12 which shows the LCID value included in a MAC-protocol message being set to "backup path" (54). In yet another embodiment the "backup path" indication can be placed in the physical layer. In one embodiment this may be in the Random Access Preamble i.e. that a specific range of these values is used to indicate "backup path".

In addition to the indication that the path is a backup path at the establishment of the radio link it is also extremely useful if a backup path can be indicated as a backup path during the process of handover of a connection from one base station to another. This indication can be performed in any of the ways described above, using the radio layer signalling to provide an indication that the connection to be handed over is used for a backup path. However, in an alternative embodiment of the invention, the explicit indication of a backup path is provided in the handover signalling from the source base station to the target base station. This has the advantage of providing the explicit indication before any radio link establishment signalling commences. The embodiments described below relate to LTE, but the person skilled in the art will appreciate that similar adaptations may be made to any handover signalling system to allow an indication that a connection to be handed over is used for a backup path.

There are two types of handover in LTE, the X2 based handover and the S1 based handover. The provision of an explicit indication of a backup path according to the invention can be provided in either type of handover.

In an embodiment applicable to an X2-based handover, the explicit indication is included for example in an X2AP Handover Request message sent from the source to the target node. This allows the target node to know very early that the handover is being prepared for user equipment with only "backup paths" and therefore allows the target node to handle the handover request with the required priority.

In an embodiment applicable to an S1-based handover, the handover preparation signalling is performed via Mobility Management Entities (MME) in the core network and the indication can, for example, be included in a RAN Transport Container information element that is forwarded to the core network transparently from the source radio base station to the target radio base station.

If the handover preparation is allowed by the target node then there is still an additional possibility in relation to the Layer 1 indications for the backup path. The target node may allocate a dedicated random access preamble for the user equipment indicating backup path. When the user equipment performs the random access procedure to the target radio base station the dedicated random access preamble can also be used to know that this is incoming handover for user equipment with backup paths only.

The person skilled in the art will appreciate that there are many other ways to incorporate an explicit indication of a backup path into handover signalling and the invention is not limited to any one method of providing such an indication.

The above embodiments and examples are all related to the Long Term Evolution and the backup path indication is early in the radio layer signalling from the UE to the eNodeB. However, the invention is not limited to LTE and the main principles apply to any radio access technology (RAT) in which radio level signalling is initially performed and then followed by additional higher layer signalling above the IP layer (one such example is MPTCP level of signalling). Examples may include GSM, WCDMA, 5G RAT, Wi-Fi etc. The person skilled in the art will appreciate that although the embodiments described relate to intra-RAT handovers (e.g. intra-LTE handovers), the principle of the invention applies equally to inter-RAT transfers. Likewise it can be applied to transfer of connections between channels in a cell, for example channel-switching in WCDMA/HSPA.

In addition to the mechanism for communication between the user equipment and the eNodeB or between eNodeBs at handover it is also necessary to have a mechanism by which the lower protocol layers in the user equipment recognise that the higher layer activity relates to a backup path. This requires therefore mechanisms for indicating to the lower layers that a backup path is being established so as to enable the correct setting of the explicit indication.

A first mechanism by which this can be achieved comprises explicit signalling from the higher layers to the lower layers about backup paths. A second mechanism involves the lower layers inspecting traffic received from high layers and detecting that these are backup paths. The lower protocol layer, or lower layer, can be of any of the described RRC, MAC and/or Layer 1 protocol layers.

Figure 13:
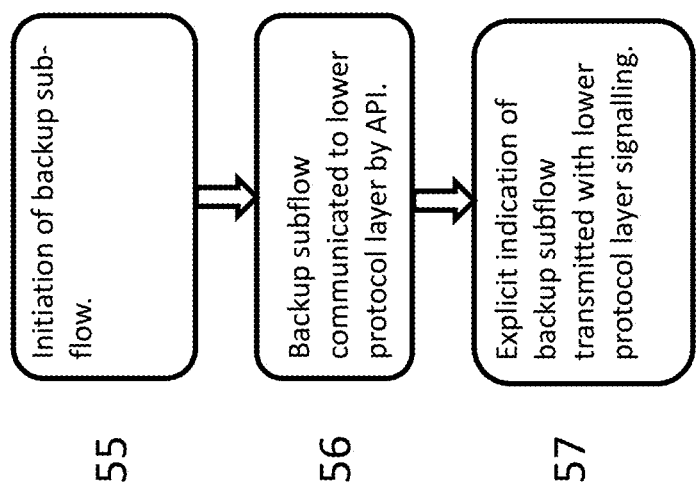
FIG. 13 is a flow diagram for an Application Program for providing an indication of a backup path to a lower protocol layer.

FIG. 13 shows a flow chart of the first mechanism in which the backup path is initiated locally in the user equipment (55) and the backup path indication is communicated to a lower protocol layer in the user equipment by the application programming the interface (56) and this explicit indication is recognised by the lower layer protocol and transmitted with lower protocol layer signalling to the radio base station (57).

Figure 14:
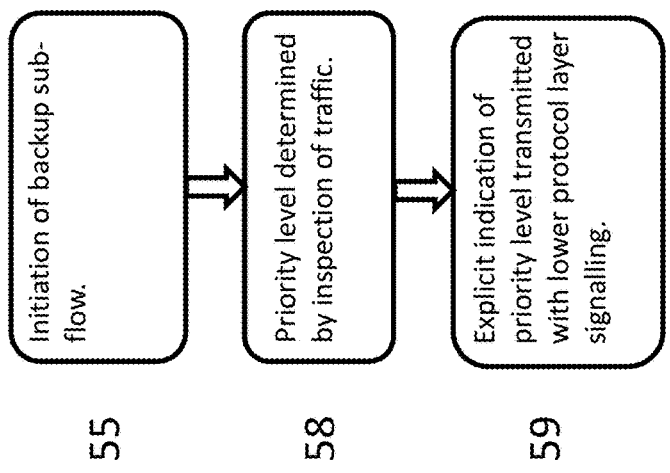
FIG. 14 is a flow diagram for an Application Programing Interface for determining a backup path by packet inspection.

FIG. 14 is a flow chart of the second mechanism in which the explicit indication of backup path is determined by inspection of traffic in the user equipment. Once again the initiation of backup path takes place locally in the UE at (55), the traffic is inspected (58) and explicit indication of the backup path is transmitted with the lower layer protocol signalling to the radio base station (59). The inspection of the traffic can be either shallow packet inspection and/or deep packet inspection. Shallow packet inspection involves the inspection of the packet headers or the TCP optional header fields used for MPTCP signalling. Deep packet inspection involves the inspection of the payload of the packets or segments to recognise the type of traffic involved. So, for example, traffic not carrying data would be recognised as backup paths.

In an embodiment using the first mechanism, the user equipment has an internal application program interface (API) allowing the explicit indication of "backup paths". These APIs can be used on different layers towards the lower layers and can, for example, be used by applications and/or operating system components (such as MPTCP implementation).

Figure 15:
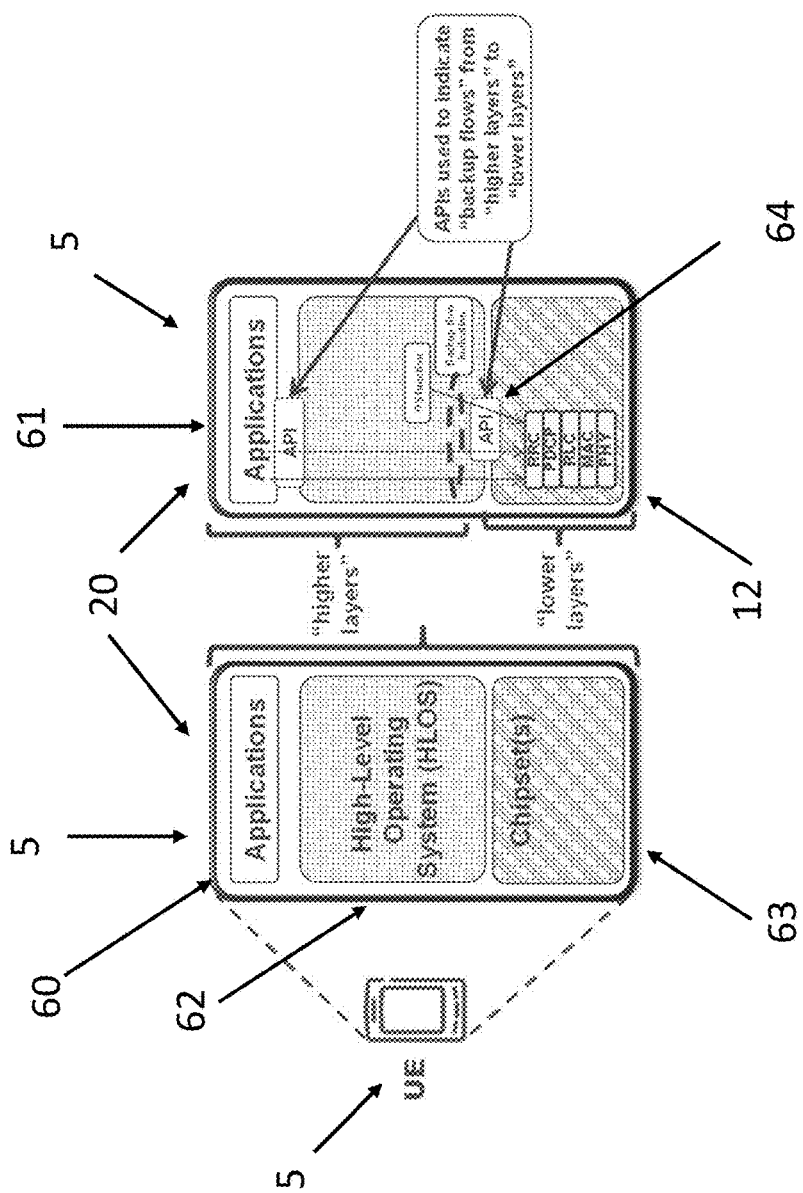
FIG. 15 is a functional diagram of user equipment apparatus for providing an indication of a backup path to a lower protocol layer.

FIG. 15 is a functional diagram the user equipment with the first mechanism. Two views of the functionality of user equipment (5) are shown. The first (60) shows the applications (20), higher level operating system (62) and chip-sets for the lower levels (63). The second view (61), shows an API (64) between the higher layers and the lower layers of the protocol stack which is used to indicate from the higher layers to the lower layers that the activity corresponds to that of the backup path.

Figure 16:
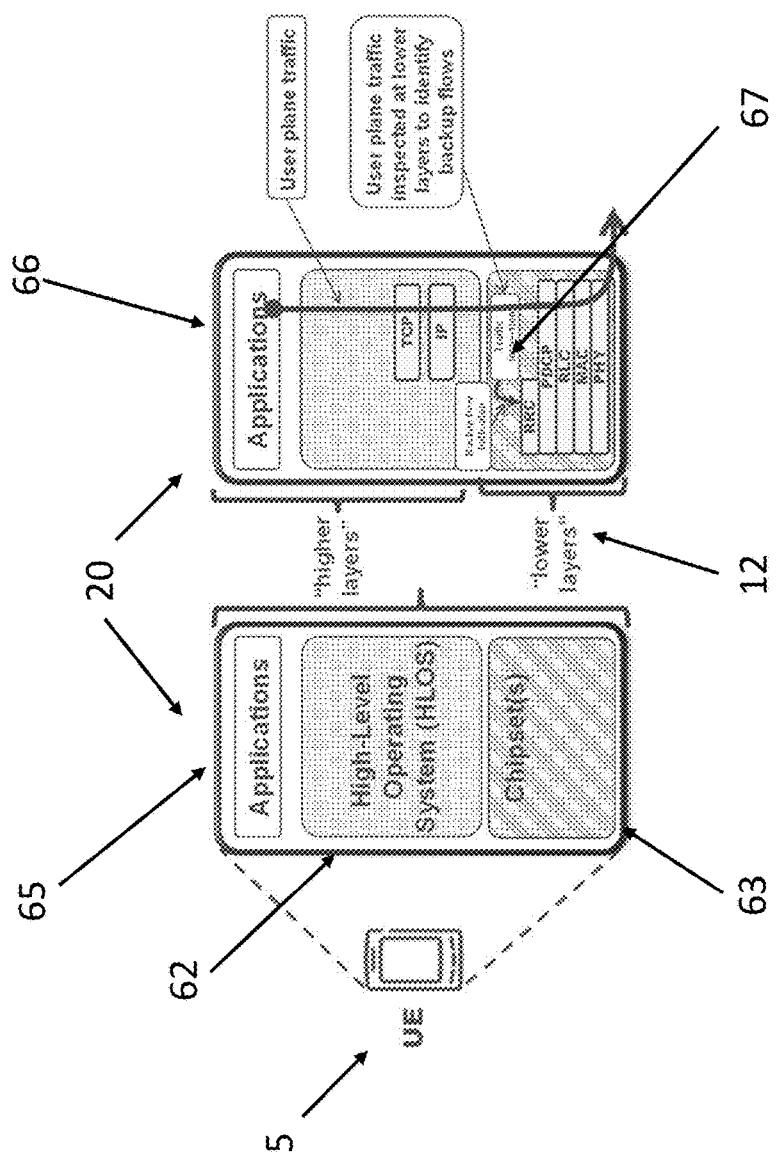
FIG. 16 is a functional diagram of user equipment apparatus for determining a backup path by packet inspection.

FIG. 16 is a functional diagram of user equipment (5) for use with the second mechanism. Again two views are shown. The first (65) shows chipset (61) for implementing the described "lower layer" protocols, higher level protocols (62) and applications (20). The second view (66) shows the traffic inspection (67), which takes the place of the API. Instead of the provision of an explicit indication provided by an API to indicate that an activity is related to a backup path, this task is performed by traffic being inspected to identify that the path is a backup subflow (67).

The embodiments described in relation to FIGS. 13, 14, 15 and 16 also apply for the case when change of the status of the early indication of backup paths for already established radio links is provided and transmitted to the radio base station. Both the internal API and inspection of traffic in the UE can be used also for this purpose also.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a communication network, comprising user equipment and a network node, the method comprising the steps of:
   prior to initiating establishment on, or handover to, a radio link involving the network node, of a backup path for a multipath connection, providing an explicit indication of a backup path for the network node;
   transmitting the explicit indication to the network node to indicate that the user equipment has only backup path in a particular radio access network; and
   at the network node, interpreting the explicit indication for handling and prioritizing use of radio network resources and/or managing connection characteristics for the radio link, wherein handling and prioritizing use of the radio network resources comprise applying admission control or by giving the user equipment with only the backup path in a lower priority compared to other paths and user equipment, wherein managing connection characteristics for the radio link comprises managing of power for the connection which supports the backup path.

2. The method as claimed in claim 1, further comprising the step of establishing a main path for the multipath connection.

3. The method as claimed in claim 1, wherein the multipath connection is controlled by a Multi-Path Transmission Control Protocol.

4. The method as claimed in claim 1, wherein the explicit indication is provided in signalling from the User Equipment to the network node of one or more of a layer 3 protocol (RRC), a medium access control layer or a physical layer.

5. The method as claimed in claim 4, wherein the explicit indication is provided in signalling of a Radio Resource Control protocol.

6. The method as claimed in claim 1, wherein the step of providing an explicit indication comprises, at the user equipment, the step of a network layer above layer 3informing at least one lower layer of the backup path by means of an application programming interface.

7. The method as claimed in claim 1, wherein the step of providing an explicit indication comprises, at the user equipment, determining the backup path by inspecting traffic of the multipath connection.

8. The method as claimed in claim 1, wherein the explicit indication is included in handover preparation signalling to the network node from a second network node.

9. The method as claimed in claim 8, wherein the handover signalling comprises S1AP or X2AP signalling.

10. The method as claimed in claim 1, wherein the handover comprises a handover to a different Radio Access Technology (RAT) and/or a different radio channel in the same radio access technology.

11. The method as claimed in claim 1, further comprising the step of providing and transmitting an explicit indication of a change in a status of a path from being a backup path to a main path or vice versa.

12. An apparatus for use in user equipment in a communication network, the apparatus comprising:
processor circuitry;
a storage unit storing instructions executable by said processor circuitry whereby the user equipment is operative to:
prior to initiation of establishment on or of handover to a radio link involving a network node of a backup path for a multipath connection, provide an explicit indication of a backup path to the network node; and
transmitting the explicit indication to the network node to indicate that the user equipment has only backup path in a particular radio access network,
wherein the explicit indication is transmitted to the network node for handling and prioritizing use of radio network resources and/or managing connection characteristics for the radio link, wherein handling and prioritizing use of the radio network resources comprise applying admission control or by giving the user equipment with only the backup path in a lower priority compared to other paths and user equipment, wherein managing connection characteristics for the radio link comprises managing of power for the connection which supports the backup path.

13. The apparatus as claimed in claim 12, whereby the user equipment is further configured to establish a main path for the multipath connection.

14. The apparatus as claimed in claim 12, operative to provide an explicit indication for the backup path when the multipath connection is controlled by a Multi-Path Transmission Control Protocol.

15. The apparatus as claimed in claim 12, operative to provide the explicit indication in signalling of one or more of a layer 3 protocol, a medium access control layer and a physical layer protocol.

16. A user equipment comprising an apparatus as claimed in claim 12.

17. An apparatus for use in a network node, the apparatus comprising:
processor circuitry; and
a storage unit storing instructions executable by said processor circuitry whereby the apparatus is operative to:
prior to an initiation of establishment on or of handover to a radio link involving the network node of a backup path for a multipath connection, receive and interpret an explicit indication of the backup path; and
based on the interpretation, handling and prioritizing use of radio network resources and/or managing connection characteristics for said radio link, wherein handling and prioritizing use of the radio network resources comprise applying admission control or by giving a user equipment with only the backup path in a lower priority compared to other paths and user equipment, wherein managing connection characteristics for the radio link comprises managing of power for the connection which supports the backup path.

18. The apparatus as claimed in claim 17, operative to receive and interpret an explicit indication of a change in a status of a path from being a backup path to a main path or vice versa.

19. The apparatus as claimed in claim 17 operative to interpret the explicit indication in one or more of a layer 3 protocol, a medium access control layer and a physical layer protocol.

20. The apparatus as claimed in claim 17, operative to interpret the explicit indication in a Radio Resource Control protocol.

* * * * *